(12) United States Patent
Shelby et al.

(10) Patent No.: US 10,337,397 B2
(45) Date of Patent: Jul. 2, 2019

(54) PRE-CHAMBER IGNITION SYSTEM

(71) Applicant: Ford Global Technologies, LLC, Dearborn, MI (US)

(72) Inventors: Michael Howard Shelby, Plymouth, MI (US); Brad Alan VanDerWege, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/622,364

(22) Filed: Jun. 14, 2017

(65) Prior Publication Data

US 2018/0363539 A1 Dec. 20, 2018

(51) Int. Cl.
*F02B 19/16* (2006.01)
*F02B 19/10* (2006.01)
*F02B 19/12* (2006.01)

(52) U.S. Cl.
CPC ............ *F02B 19/16* (2013.01); *F02B 19/108* (2013.01); *F02B 19/12* (2013.01)

(58) Field of Classification Search
CPC ........ F02B 19/12; F02B 19/16; F02B 19/108; F02B 19/00
USPC ................ 123/260, 435, 445, 478–481, 490; 701/102–105, 111
See application file for complete search history.

(56) References Cited

U.S. PATENT DOCUMENTS

| | | | |
|---|---|---|---|
| 5,245,963 A | 9/1993 | Sabol et al. | |
| 5,829,407 A | 11/1998 | Watson et al. | |
| 9,249,746 B2 | 2/2016 | Geckler et al. | |
| 2012/0103302 A1 | 5/2012 | Attard | |
| 2014/0261298 A1* | 9/2014 | Sasidharan | F02B 19/18 123/275 |
| 2016/0230645 A1* | 8/2016 | Schock | F02B 19/12 |
| 2017/0284320 A1* | 10/2017 | Holst | F02P 5/1502 |

OTHER PUBLICATIONS

Vanderwege, B., "Pre-Chamber Ignition System," U.S. Appl. No. 15/346,464, filed Nov. 8, 2016, 59 pages.

* cited by examiner

*Primary Examiner* — John Kwon
*Assistant Examiner* — Johnny H Hoang
(74) *Attorney, Agent, or Firm* — Julia Voutyras; McCoy Russell LLP

(57) ABSTRACT

Methods and systems are provided for purging a pre-chamber. In one example, a system is provided with a combustion chamber formed by a cylinder head coupled to a cylinder block and a pre-chamber in fluidic communication with the combustion chamber. The system is also provided with a purge port coupled to the pre-chamber and structured to flow purge air into the pre-chamber, where the flow of the purge air is driven by operation a purge pump and a piston disposed within the combustion chamber.

18 Claims, 6 Drawing Sheets

PRE-CHAMBER IGNITION SYSTEM

FIELD

The present description relates generally to a pre-chamber ignition system and method for operation of such a system.

BACKGROUND/SUMMARY

Engines have in the past utilized pre-chamber combustion to increase combustion efficiency and correspondingly reduce emissions. Pre-chamber combustion systems typically include an auxiliary pre-chamber above the main combustion chamber with an ignition device and fuel injector coupled to the auxiliary pre-chamber. In such systems, combustion unfolds in the following sequence; (i) a small amount of fuel is directly injected into the pre-chamber, (ii) spark is provided to the air/fuel mixture in the pre-chamber; and (iii) the hot gas jets into the main combustion chamber to ignite the charge disposed therein. Jetting the ignited gas into the main combustion chamber in this manner enables hot gas jets to penetrate deeper into the main combustion chamber, causing more evenly distributed ignition, when compared to engines that do not employ pre-chamber schemes.

One example approach shown by Attard in U.S. 2012/0103302 includes a system with an ignition assembly with a pre-chamber, a fuel injector, and a spark plug that is mounted in the cylinder head above the main combustion chamber. Attard's pre-chamber ignition system achieves fast burn in fuel-lean conditions. However, the inventors have recognized several potential drawbacks with Attard's system and other pre-chamber assemblies. For instance, residual burned gases may dwell in the pre-chamber, diluting the air/fuel mixture in subsequent combustion cycles. As a result, combustion efficiency is decreased and emissions are associatively increased. Moreover, the supplemental fuel injected into the pre-chamber may not enhance ignitability or burn rate during stoichiometric conditions. Therefore, Attard's system may only achieve efficiency gains during a limited window of engine operation. The inventors have also recognized that further problems could arise if exhaust gas recirculation (EGR) were to be employed in Attard's system or other pre-chamber combustion systems. For instance, flowing EGR into the main combustion chamber can exacerbate the problem of pre-chamber dilution which limits the applicability of pre-chamber ignitions systems for extending the tolerance of the engine to high rates of EGR (internal or external). Dilution with inert burned gas, external EGR or internal residuals, is beneficial to engine efficiency and may be limited by ignitability and by burn rate. If robust ignition can be achieved within the pre-chamber of a pre-chamber ignition system, it will accelerate the burn rate in main chamber and improve the engine dilution tolerance and engine efficiency. Attempts have been made to purge pre-chambers via air assisted injectors. However, systems employing secondary chamber air injectors have in the past required complicated controls, hardware, and mechanical assemblies to implement, thereby increasing the cost and complexity of the engine.

The inventors have recognized the aforementioned problems and facing these challenges developed a system, in one example, to address the problems. The system includes a combustion chamber formed by a cylinder head coupled to a cylinder block and a pre-chamber in fluidic communication with the combustion chamber. The system also includes a purge port coupled to the pre-chamber and structured to flow purge air into the pre-chamber, where the flow of the purge air is driven by operation a purge pump and a piston disposed within the combustion chamber. In this way, fresh air can be directed into the pre-chamber to scavenge the chamber of residual gases via purge pump operation. Purging the residual exhaust gases from the pre-chamber combustion enables combustion efficiency to be increased and emissions to be reduced. Specifically, the purging of the pre-chamber enables the burn rate to be increased and combustion stability to be improved under residual conditions, such as during EGR operation and when internal combustion chamber residuals occur.

As one example, in the system the purge pump may be a positive displacement pump including a plunger attached to an intake valve stem, the purge airflow generated by reciprocal motion of the plunger. In this way, motion of the intake valve can be used to drive a displacement pump for pre-chamber purge airflow. Consequently, the system can efficiently purge the pre-chamber without the need for additional complex and bulky purge components, controls, etc., if desired. Moreover, using intake valve movement to drive purge operation enables purge airflow to be delivered at desired time intervals (e.g., during an intake stroke), thereby avoiding mistimed purge events.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a system and method for scavenging a pre-chamber in an internal combustion engine. The system may include, in one example, a purge port coupled to a pre-chamber and providing purge air thereto. In such a system, purge airflow through the pre-chamber is driven by a purge pump attached to the purge port. The purge airflow acts to flush out residual gases in the pre-chamber between cyclical pre-chamber ignition events during which an air/fuel mixture is ignited in the pre-chamber and then jetted into the combustion chamber. Flushing the pre-chamber with intake air has several advantages over previous systems including increasing combustion burn rate and improving combustion stability. The burn rate increase and combustion stability improvements may be particularly pronounced under residual conditions where residual gases are present in the combustion chamber after an exhaust stroke (e.g., EGR residuals, internal residuals). Consequently, combustion efficiency gains and emission reductions can be jointly achieved. In one example, the purge pump may be a positive displacement pump leveraging the reciprocal motion of the intake valve to drive purge airflow into the pre-chamber. By utilizing the intake valve's reciprocal motion for purge pumping action, not only can the system's compactness and efficiency be increased, but the timing of the purge airflow can be coordinated with intake valve stroke. Consequently, mistimed purge airflow events can be avoided, if desired. Moreover, the cost and complexity of the pre-chamber ignition system may be reduced when the intake valve provides not only valving operation but also pumping action in a purge pump. Additionally, in such an example, the purge pump may be operated at intake port pressure. As a result, a desired amount of purge air can be provided to the pre-chamber as the intake port pressure varies based on engine operating conditions.

Figure 1:
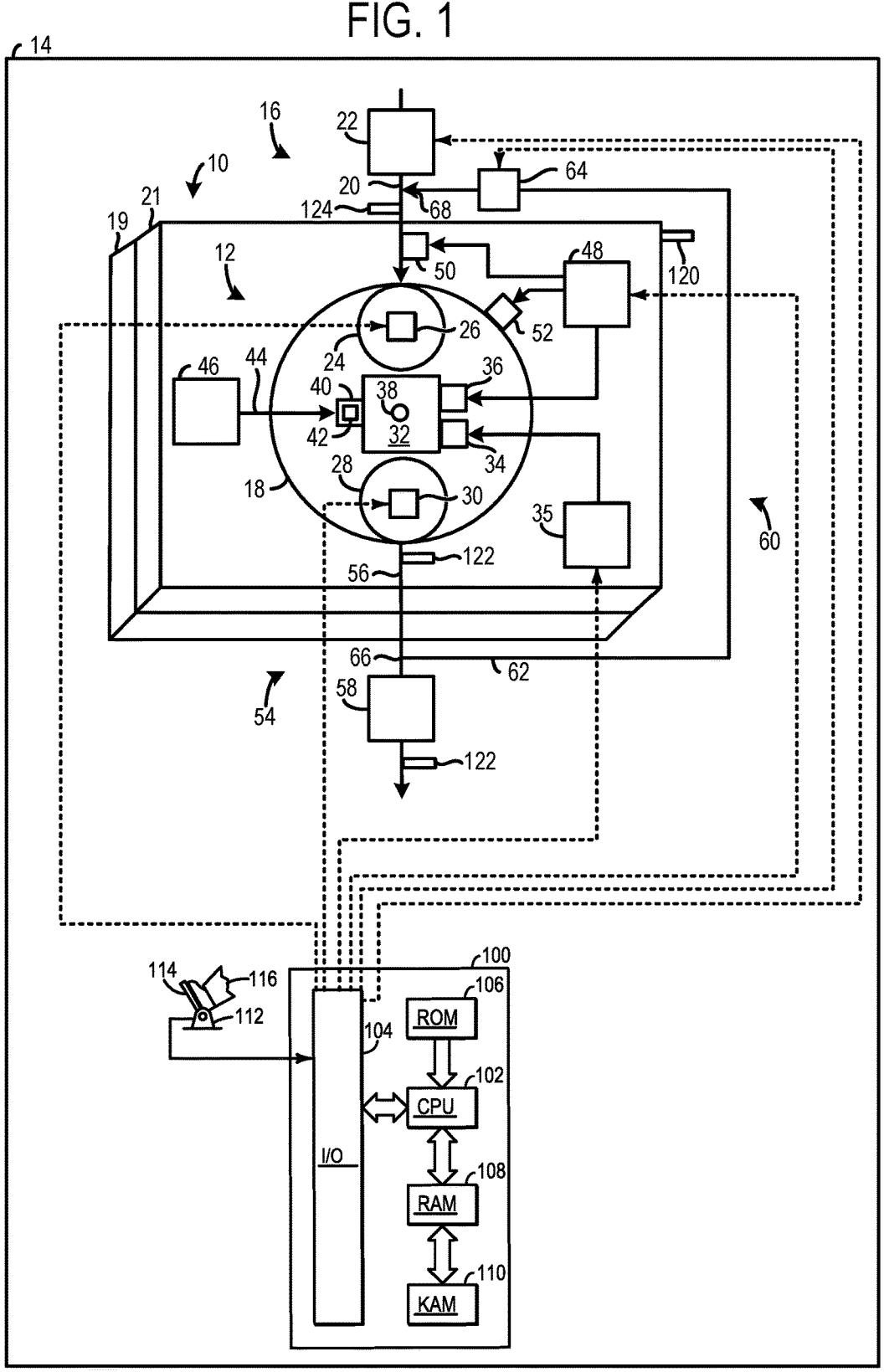
FIG. 1 shows a schematic depiction of an internal combustion engine including a pre-chamber ignition system.
Figure 2:
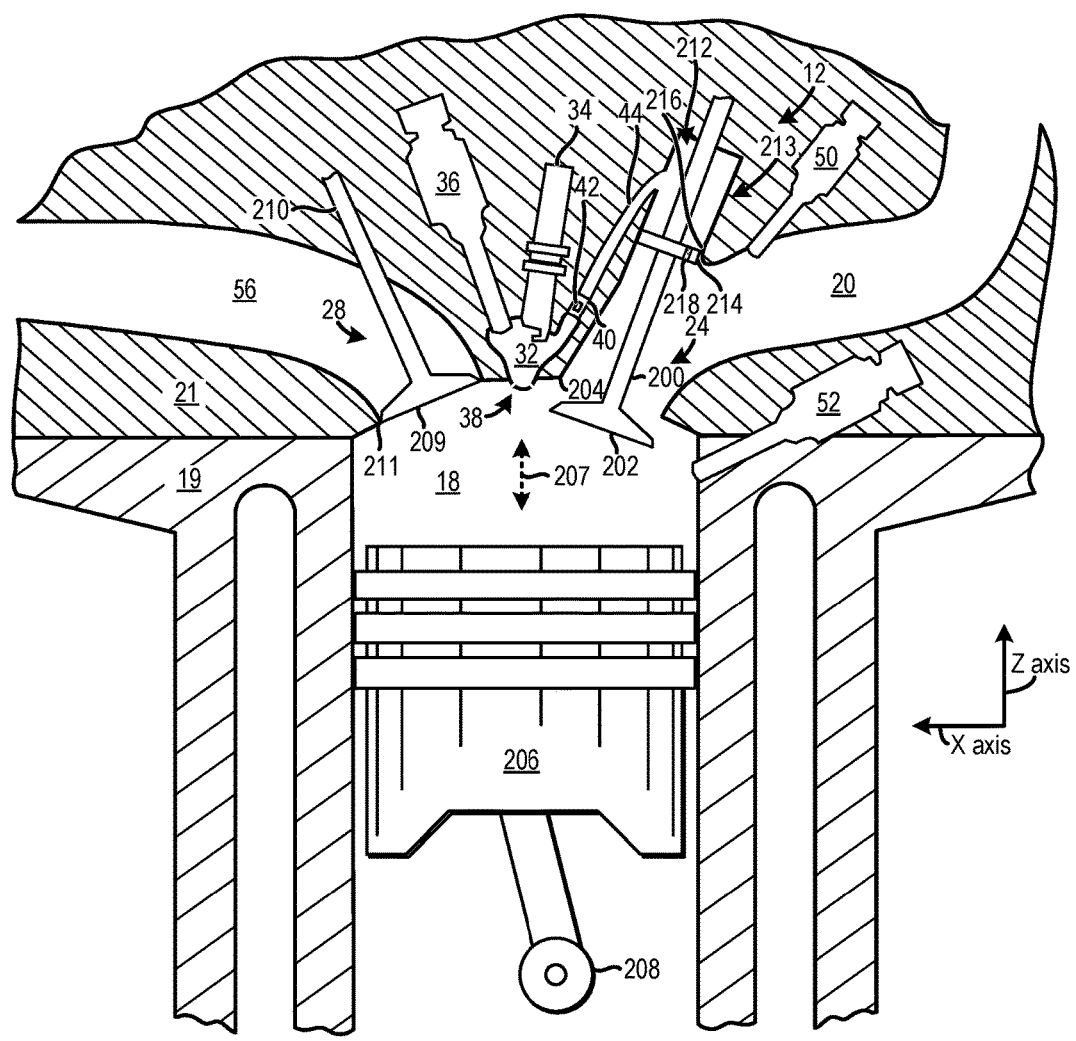
FIG. 2 shows an illustration of a cross-section of a first embodiment of the pre-chamber ignition system, shown in FIG. 1.
Figure 3:
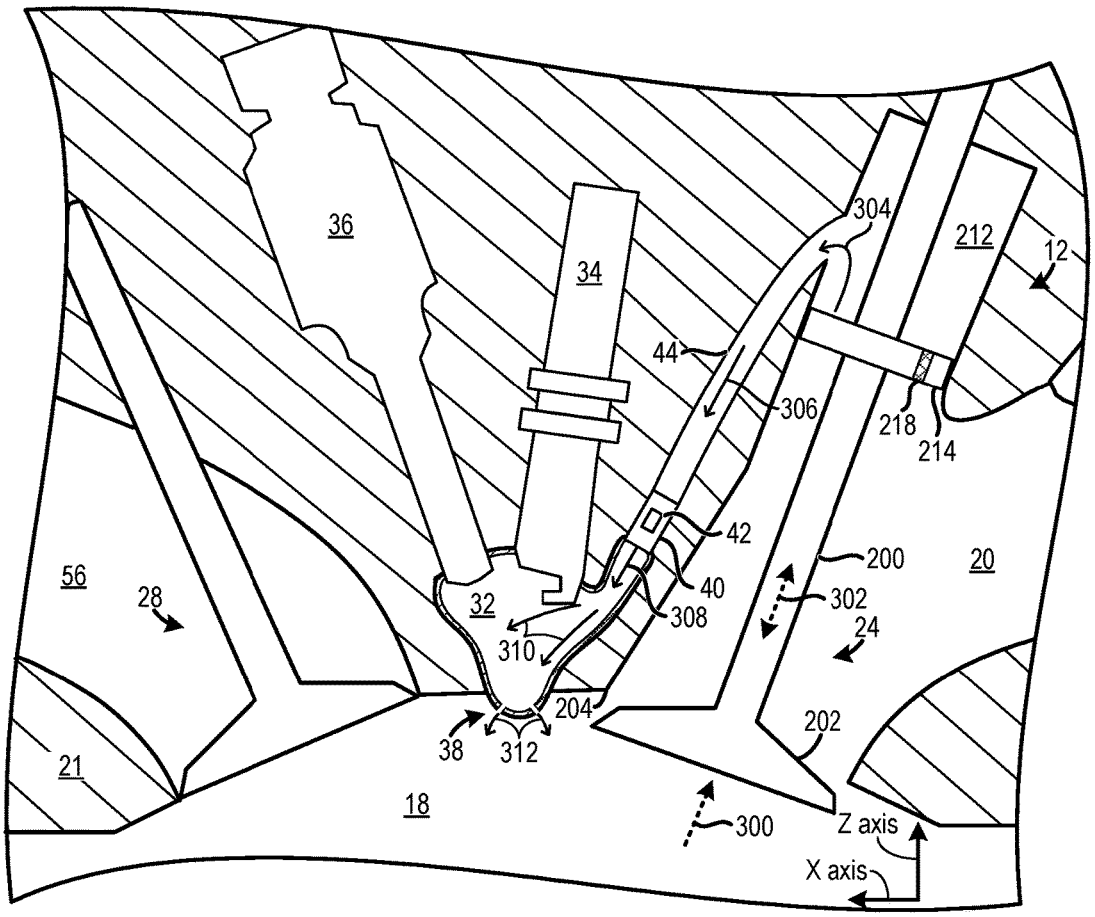
FIG. 3 shows a detailed view of the pre-chamber ignition system shown in FIG. 2 while the intake valve is closing.
Figure 4:
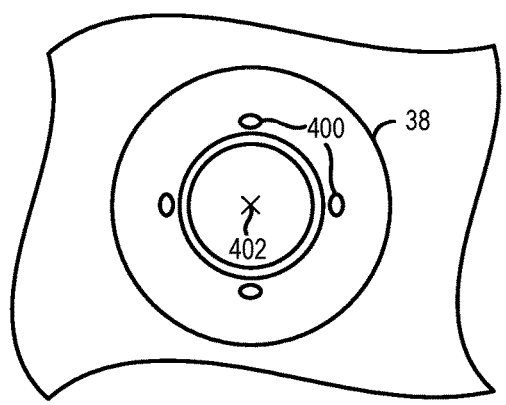
FIG. 4 shows a detailed view of the nozzle included in the pre-chamber ignition system shown in FIG. 3.
Figure 5:
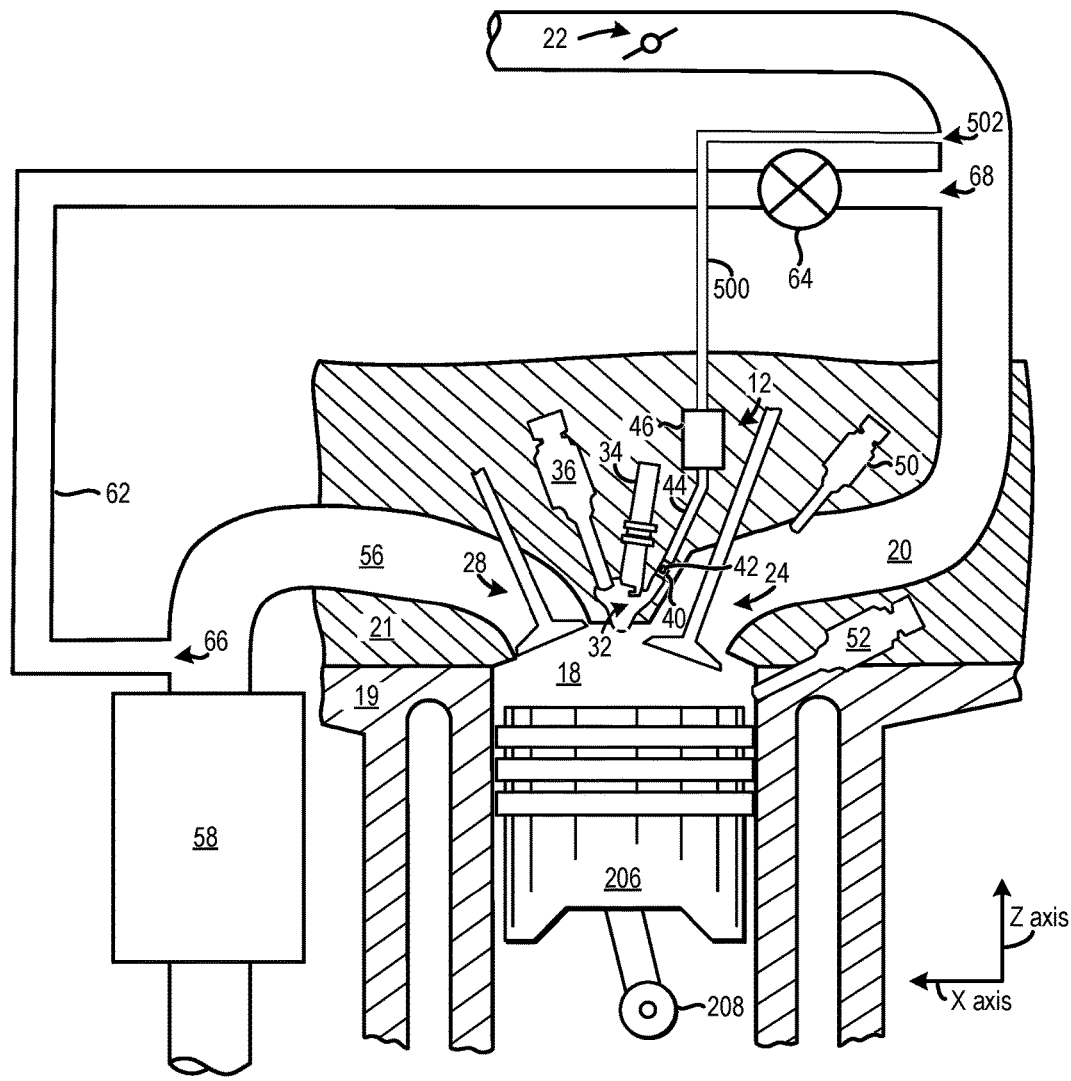
FIG. 5 shows an illustration of a cross-section of a second embodiment of the pre-chamber ignition system, shown in FIG. 1.
Figure 6:
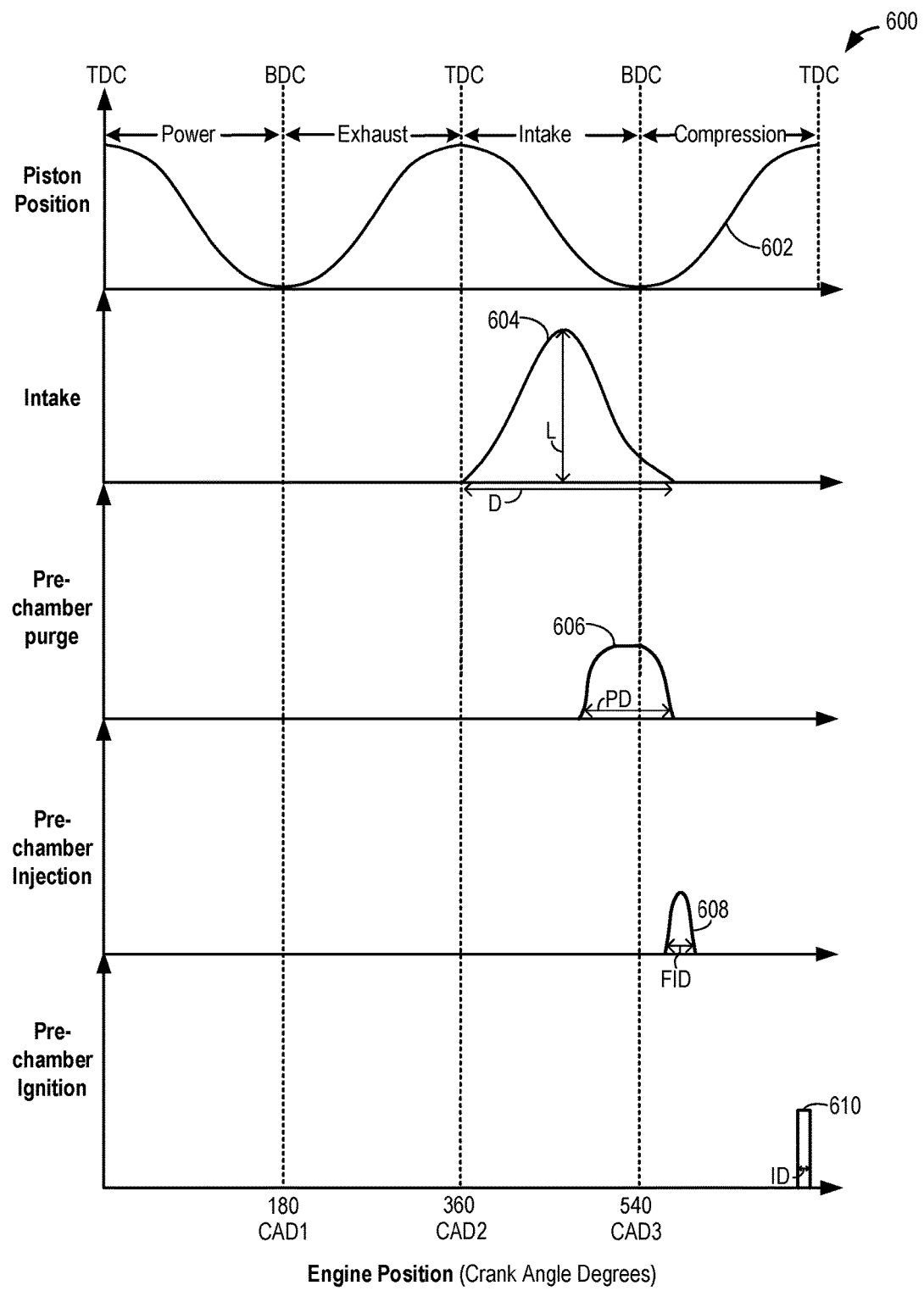
FIG. 6 shows a timing diagram an exemplary pre-chamber purge cycle.
Figure 7:
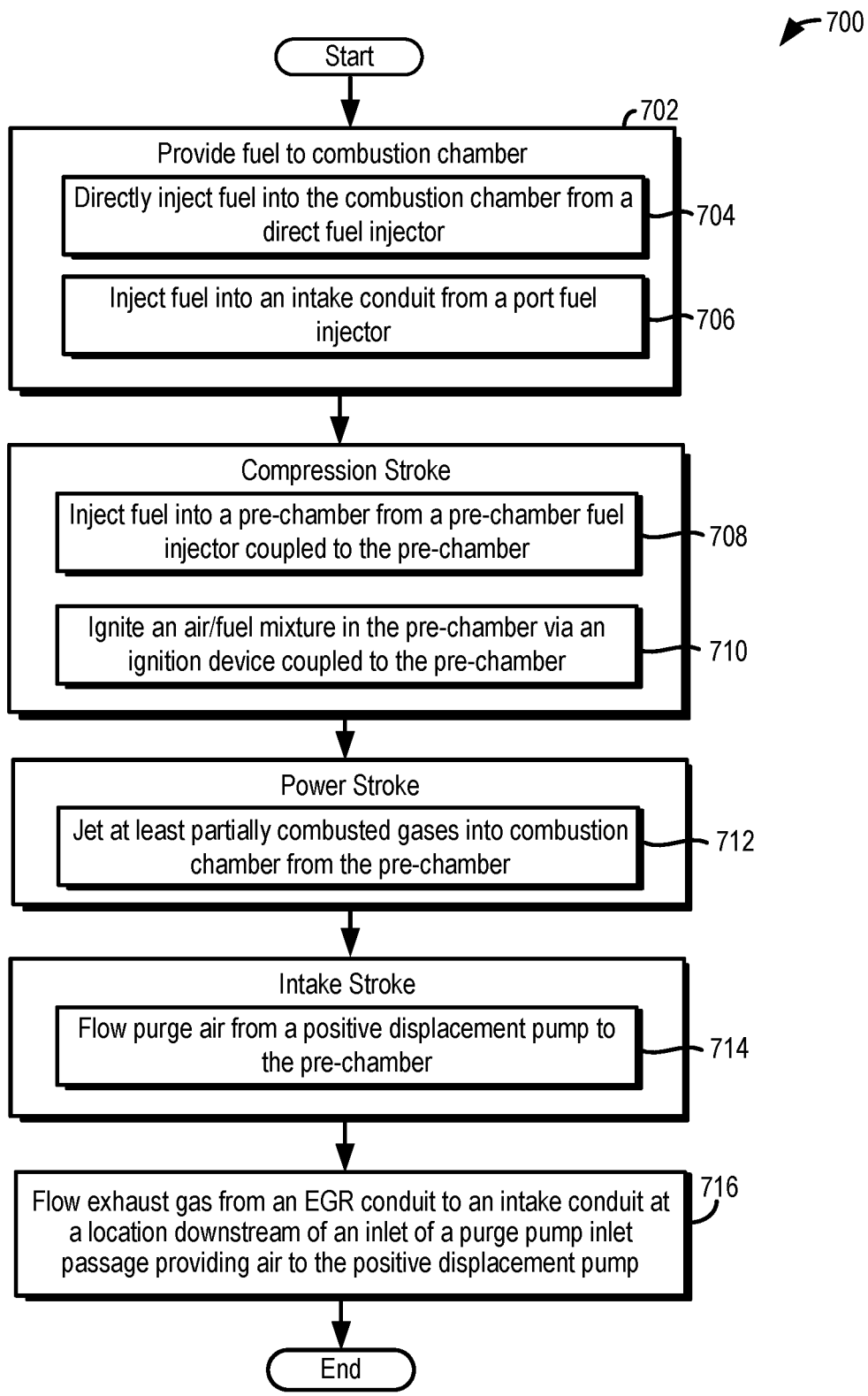
FIG. 7 shows a method for operation of a pre-chamber ignition system.

FIG. 1 shows a schematic depiction of an engine employing a pre-chamber ignition system with purging capabilities. FIG. 2 shows a first embodiment of the pre-chamber ignition system shown in FIG. 1. FIG. 3 shows a detailed view of the first embodiment of the pre-chamber ignition system with flow patterns providing insight into the pre-chamber flow dynamics during pre-chamber purge. FIG. 4 shows a detailed view of the structure of the nozzle in the first embodiment of the pre-chamber ignition system, shown in FIG. 3. FIG. 5 shows a second embodiment of the pre-chamber ignition system shown in FIG. 1. FIG. 6 shows a timing diagram of the intake valve, pre-chamber injection, pre-chamber spark ignition, and pre-chamber purge event in a pre-chamber ignition system. FIG. 7 shows a method for operation of a pre-chamber ignition system.

Turning to FIG. 1, an engine 10 with a pre-chamber ignition system 12 in a vehicle 14 is schematically illustrated. Although, FIG. 1 provides a schematic depiction of various engine and pre-chamber ignition system components, it will be appreciated that at least some of the components may have a different spatial positions and greater structural complexity than the components shown in FIG. 1. The structural details of the components are discussed in greater detail herein with regard to FIGS. 2-5.

An intake system 16 providing intake air to a combustion chamber 18 is also depicted. The combustion chamber 18 is formed by a cylinder block 19 coupled to a cylinder head 21. Although, FIG. 1 depicts the engine 10 with one cylinder. The engine 10 may have an alternate number of cylinders, in other examples. For instance, the engine 10 may include two cylinders, three cylinders, six cylinders, etc., in other examples.

The intake system 16 includes an intake conduit 20 and a throttle 22 coupled to the intake conduit. The throttle 22 is configured to regulate the amount of airflow provided to the combustion chamber 18. In the depicted example, the intake conduit 20 feeds air to an intake valve 24. However, in other examples, such as in the case of a multi-cylinder engine, the intake system may further include an intake manifold.

The intake valve 24 may be actuated by an intake valve actuator 26. Likewise, an exhaust valve 28 may be actuated by an exhaust valve actuator 30. In one example, both the intake valve actuator 26 and the exhaust valve actuator 30 may employ cams coupled to intake and exhaust camshafts, respectively, to open/close the valves. Continuing with the cam driven valve actuator example, the intake and exhaust camshafts may be rotationally coupled to a crankshaft. Further in such an example, the valve actuators may utilize one or more of cam profile switching (CPS), variable cam timing (VCT), variable valve timing (VVT) and/or variable valve lift (VVL) systems to vary valve operation. Thus, cam timing devices may be used to vary the valve timing, if desired. It will therefore be appreciated that valve overlap may occur. In another example, the intake and/or exhaust valve actuators, 26 and 30, may be controlled by electric valve actuation. For example, the valve actuators, 26 and 30, may be electronic valve actuators controlled via electronic actuation. In yet another example, combustion chamber 18 may alternatively include an exhaust valve controlled via electric valve actuation and an intake valve controlled via cam actuation including CPS and/or VCT systems. In still other embodiments, the intake and exhaust valves may be controlled by a common valve actuator or actuation system.

The pre-chamber ignition system 12 is configured to initiate combustion in a pre-chamber 32. To elaborate, the pre-chamber ignition system 12 includes a pre-chamber ignition device 34 (e.g., spark plug) and a pre-chamber fuel injector 36 coupled to the pre-chamber 32. The pre-chamber ignition device 34 is configured to provide spark to the pre-chamber 32 at desired time intervals. An ignition system 35 may provide power to the pre-chamber ignition device 34. Furthermore, the pre-chamber fuel injector 36 is configured to inject fuel into the pre-chamber 32 at selected time intervals. An exemplary pre-chamber spark and fuel delivery scheme is illustrated in FIG. 6, discussed in greater detail herein.

The pre-chamber ignition system 12 also includes a pre-chamber nozzle 38 providing fluidic communication between the pre-chamber 32 and the combustion chamber 18. The pre-chamber nozzle 38 is designed to jet partially combusted gases into the combustion chamber 18 during the power stroke to seed ignition in the combustion chamber. Specifically, the pre-chamber nozzle 38 may include orifices connected to passages fluidically connecting the pre-chamber 32 to the combustion chamber 18. Expelling the hot gas jets into the combustion chamber enables the jets to penetrate deep into the combustion chamber, causing more evenly distributed ignition, when compared to previous system's delivering spark directly to the main combustion chamber.

The pre-chamber ignition system 12 also includes a purge port 40 structured to direct purge airflow to the pre-chamber 32. In other words, the purge port 40 is in fluidic communication (e.g., direct fluidic communication) with the pre-chamber 32. Specifically, the purge port 40 may include an outlet opening into the pre-chamber 32, an inlet opening into the purge passage 44, and a passage extending between the inlet and outlet to provide the aforementioned fluidic communication. Scavenging the pre-chamber 32 with purge gas enables combustion burn rate to be increased and combustion stability to be improved (e.g., increased). Consequently, combustion efficiency is increased and emissions are reduced. In the depicted example, the purge port 40 includes a purge valve 42 regulating the flow of purge air into the pre-chamber 32. Specifically, the purge valve 42 may be designed to reduce the likelihood (e.g., prevent) of burned gasses and high pressure from traveling from the pre-chamber 32 back to the purge passage 44 and pump 213. In one example, the purge valve 42 may be a check valve configured to open when a pressure in a purge passage 44, in the pre-chamber ignition system 12, exceeds a pressure in the pre-chamber (32) by a small threshold value (e.g., 1-5 kPa). Likewise, the purge valve 42 may be configured to close when the pressure in the purge passage 44 drops below a threshold value. The check valve may include suitable mechanisms such as a spring coupled to a ball or disk extending across a valve passage to enable the aforementioned functionality. However, other types of valves have been contemplated. Thus, in other examples the purge valve 42 may be an active valve adjustable via a controller 100. For instance, the purge valve 42 may be an electronically controlled solenoid valve.

The purge passage 44 is coupled to and receives airflow from a purge pump 46. In one example, the purge pump 46 may be a positive displacement pump. Specifically, in such an example, the reciprocal motion of the intake valve 24 may cause pumping action in the purge pump 46. For instance, the purge pump 46 may include a valve stem chamber surrounding an intake valve stem. Continuing with such an example, the purge pump 46 may also include a plunger coupled (e.g., fixedly coupled) to the valve stem and disposed in the valve stem chamber. The plunger may move in axially opposing directions in the valve stem chamber to generate pre-chamber purge airflow. However, other energy sources that drive pumping action in the purge pump have been contemplated. For instance, the purge pump 46 may be driven by rotational energy from a crankshaft, an energy storage device, etc. In yet another example, the purge pump may be a positive displacement pump driven by an exhaust valve, an electric compressor, an e-boost device (e.g., electric supercharger or turbocharger), a mechanical pump driven from the crank or cam, a plunger driven by the camshaft, etc. In the example where the exhaust valve drives the pump, feed air for the pump may be drawn from a location in the intake system that may be upstream of an EGR outlet.

A fuel delivery system 48 is also shown in FIG. 1. The fuel delivery system 48 provides pressurized fuel to the pre-chamber fuel injector 36. The fuel delivery system 48 is also shown providing pressurized fuel to a port fuel injector 50 and/or a direct fuel injector 52. The fuel delivery system 48 may include conventional components such as fuel tanks, fuel pumps, check valves, return lines, etc., to enable fuel to be provided to the injectors at desired pressures. It will be appreciated that in other examples, the port fuel injector 50 or the direct fuel injector 52 may be omitted from the engine 10.

An exhaust system 54 configured to manage exhaust gas from the combustion chamber 18 is also included in the vehicle 14 depicted in FIG. 1. The exhaust system 54 includes the exhaust valve 28 coupled to the combustion chamber 18, and exhaust conduit 56. The exhaust system 54 also includes an emission control device 58. The emission control device 58 may include filters, catalysts, absorbers, etc., for reducing tailpipe emissions.

The vehicle 14 further includes an exhaust gas recirculation (EGR) system 60 having an EGR conduit 62 and EGR valve 64. The EGR conduit 62 includes an inlet 66 coupled to the exhaust conduit 56 upstream of the emission control device 58 and an outlet 68 opening into the intake conduit 20 downstream of the throttle 22. However, other EGR conduit routing arrangements have been contemplated, such as EGR conduit with an inlet downstream of the emission control device. Further still in another example, the EGR conduit outlet may be positioned upstream or downstream of a compressor, in the case of a boosted engine. It will be appreciated that in other examples, the EGR system may be omitted from the vehicle.

FIG. 1 also shows a controller 100 in the vehicle 14. Specifically, controller 100 is shown in FIG. 1 as a conventional microcomputer including: microprocessor unit 102, input/output ports 104, read-only memory 106, random access memory 108, keep alive memory 110, and a conventional data bus. Controller 100 is configured to receive various signals from sensors coupled to the engine 10. The sensors may include engine coolant temperature sensor 120, exhaust gas sensors 122, an intake airflow sensor 124, etc. Additionally, the controller 100 is also configured to receive throttle position (TP) from a throttle position sensor 112 coupled to a pedal 114 actuated by an operator 116.

Additionally, the controller 100 may be configured to trigger one or more actuators and/or send commands to components. For instance, the controller 100 may trigger adjustment of the throttle 22, the EGR valve 64, purge pump 46, intake valve actuator 26, exhaust valve actuator 30, ignition system 35, and/or fuel delivery system 48. Specifically, the controller 100 may be configured to send signals to the pre-chamber ignition device 34, pre-chamber fuel injector 36, port fuel injector 50, and/or direct fuel injector 52 to adjust operation of the spark and fuel delivered to the pre-chamber 32 as well as the combustion chamber 18. Therefore, the controller 100 receives signals from the various sensors and employs the various actuators to adjust engine operation based on the received signals and instructions stored in memory of the controller. Thus, it will be appreciated that the controller 100 may send and receive signals from the pre-chamber ignition system 12.

For example, adjusting the pre-chamber fuel injector may include adjusting a fuel injector actuator to adjust the pre-chamber fuel injector. In yet another example, the amount of fuel to be delivered via the pre-chamber fuel injector, port fuel injector, and/or direct fuel injector may be empirically determined and stored in a predetermined lookup tables or functions. For example, one table may correspond to determining pre-chamber injection amounts, one table may correspond to determining direct injection amounts, and one table may correspond to determining port injection amounts. The tables may be indexed to engine operating conditions, such as engine speed and engine load, among other engine operating conditions. Furthermore, the tables may output an amount of fuel to inject via pre-chamber fuel injection, port fuel injection, and/or direct injection to the combustion chamber at each cylinder cycle.

FIG. 2 shows a first embodiment of the pre-chamber ignition system 12 in cross-section. In FIG. 2, the combustion chamber 18 formed by the cylinder head 21 and the cylinder block 19 is illustrated. Additionally, the exhaust valve 28 and the intake valve 24 are shown coupled to the combustion chamber 18. Correspondingly, the intake conduit 20 and the exhaust conduit 56 providing fluidic communication between upstream intake system components and downstream exhaust system components, are also depicted in FIG. 2. The intake valve 24 includes an intake valve stem 200 and an intake valve head 202. The intake valve head 202 seats and seals on an intake valve seat 204 in the cylinder head 21 when the intake valve 24 is in a closed position. However, FIG. 2 depicts the intake valve 24 in an open position where the intake valve head 202 is spaced away from the intake valve seat 204. On the other hand, in FIG. 2 the exhaust valve 28 is in a closed position where an exhaust valve head 209 is seated and sealed on an exhaust valve seat 211. Additionally, a piston 206 is disposed within the combustion chamber 18 and connected to a crankshaft 208.

The pre-chamber 32 in the pre-chamber ignition system 12 is shown positioned vertically above the combustion chamber 18 with regard to a central axis 207 of the combustion chamber 18. Additionally, the pre-chamber 32 is also positioned horizontally between the intake valve 24 and the exhaust valve 28, in the illustrated example. Coordinate axes X and Z are provided for reference. In one example, the Z axis may be parallel to a gravitational axis. Further, the X axis may be a lateral or horizontal axis. However, in other examples the pre-chamber ignition system 12 may have other orientations. Furthermore, alternate positions of the pre-chamber 32 have been contemplated. For instance, the pre-chamber 32 may be positioned on an intake side or exhaust side of the combustion chamber, between two intake valves, between two exhaust valves, on a combustion chamber side between intake and exhaust valves of a 4-valve engine, etc., in other examples.

Continuing with FIG. 2, the pre-chamber ignition device 34 and the pre-chamber fuel injector 36 of the pre-chamber ignition system 12 are also shown. As previously discussed, the pre-chamber ignition device 34 is structured to provide spark to the pre-chamber 32 and the pre-chamber fuel injector 36 is structured to provide metered fuel to the pre-chamber 32. For instance, the pre-chamber ignition device 34 may include an electrode configured to generate a spark in the pre-chamber when receiving power. Additionally, the pre-chamber fuel injector 36 may include a nozzle receiving fuel from an injector body having an actuator (e.g., solenoid) regulating the fuel metering of the nozzle. However, other types of ignition devices and fuel injectors have been contemplated.

The purge port 40 with the purge valve 42 is also shown in FIG. 2. As previously discussed, the purge port 40 in conjunction with the purge valve 42 regulates the purge airflow into the pre-chamber 32, based on a threshold pressure, for instance. In this way, purge airflow may be provided to the pre-chamber 32 during desired periods.

The purge port 40 is attached to the purge passage 44, in FIG. 2. The purge passage 44 is shown traversing a section of the cylinder head 21 horizontally between the intake valve 24 (e.g., intake valve stem 200) and the exhaust valve 28 (e.g., an exhaust valve stem 210). Specifically, the purge passage 44 is shown extending vertically and horizontally toward the intake valve stem 200. Routing the purge passage 44 in this way enables a compact arrangement of the pre-chamber ignition system to be achieved, thereby providing space saving gains. In one example, the purge passage 44 may be routed through the cylinder head such that flow losses are reduced. For instance, a short path with curved bends may be chosen to reduce conduit friction losses. However additional design parameters may be taken into account when routing the purge passage, such as the cylinder head stresses, coolant jacket profile, etc.

Additionally, the purge passage 44 is in fluidic communication with a valve stem chamber 212. The valve stem chamber 212 extend upward into the cylinder head 21 away from the intake valve head 202, in the illustrated example. In this way, the valve stem chamber is compactly integrated into the cylinder head 21. However, other valve stem chamber profiles have been contemplated. Additionally, the valve stem chamber 212 has a plunger 214 disposed therein. Furthermore, the plunger 214 is coupled (e.g., fixedly coupled) to the intake valve stem 200. The plunger 214, valve stem chamber 212, and intake valve stem 200 form a positive displacement pump 213, in the illustrated example. Essentially, the valve stem chamber 212 acts as a pumping chamber and the plunger 214 acts a pump piston moving in the pumping chamber to generate purge airflow that is expelled into the purge passage 44. Thus, reciprocal motion of the intake valve 24 and therefore plunger 214 may be used to generate purge airflow into the pre-chamber 32 and out of the pre-chamber through the pre-chamber nozzle 38. In this way, the intake valve can be designed with dual-use functionality. As a result, the pre-chamber ignition system's features can be expanded to provide pre-chamber air purge while maintaining a compact arrangement, if desired. Moreover, timing of the purge pump is coordinated with the intake valve stroke to avoid mistimed purge events.

In one example, the valve stem chamber 212 and the plunger 214 both may at least partially circumferentially surround the intake valve stem 200. Furthermore, the plunger 214 may be in near contact with a wall 216 of the valve stem chamber 212 to enable efficient pumping operation. For instance, plunger rings may be employed to reduce the amount of air passing between the plunger and the wall 216 into the intake conduit 20. However, other interfaces between the valve stem chamber and plunger have been contemplated. Additionally, a plunger valve 218, discussed in greater detail herein, with reference to FIG. 3, is also shown in FIG. 2. The port fuel injector 50 and the direct fuel injector 52 are also depicted in FIG. 2. As previously mentioned, the port and direct fuel injectors are configured to deliver fuel to the combustion chamber 18. In this way, a charge is provided in the combustion chamber that the jetted gas from the pre-chamber nozzle 38 can ignite.

FIG. 3 shows a detailed view of the pre-chamber ignition system 12 depicted in FIG. 2 while the intake valve 24 is closing. In particular, FIG. 3 shows the intake valve head 202 moving toward an intake valve seat 204 in the cylinder head 21 in a closing direction 300. As such, the intake valve 24 is moving along an actuation axis 302 of the intake valve 24. The Z axis and X axis are again provided for reference. FIG. 3 also shows the exhaust valve 28 in a closed position and exhaust conduit 56.

Movement of the intake valve 24 in the closing direction 300 correspondingly moves the plunger 214 in the closing direction 300. Movement of the plunger 214 in this way generates purge airflow from the valve stem chamber 212 into the purge passage 44. When the pressure in the purge passage 44 exceeds the threshold pressure value of the purge valve 42 in the purge port 40, the purge valve 42 opens and purge air is flowed into the pre-chamber 32. The arrows described below shed light on the general flow dynamics of purge operation in the pre-chamber ignition system 12. However, it will be appreciated that the flow pattern may have greater complexity than is illustrated. To elaborate, arrow 304 indicates the general direction of airflow into the purge passage 44 from the valve stem chamber 212. Arrow 306 indicates the general direction of airflow in the purge passage 44. Arrow 308 indicates the general direction of airflow from the purge port 40 into the pre-chamber 32 and arrows 310 depict the general direction of purge airflow in the pre-chamber 32. Likewise, arrows 312 depict the general direction of purge air expelled from the pre-chamber nozzle 38 into the combustion chamber 18.

FIG. 3 also shows the plunger valve 218 in the plunger 214. The plunger valve 218 may be configured to open and provide fluidic communication between the intake conduit 20 and the valve stem chamber 212 while the plunger 214 moves toward the intake valve seat 204. Likewise, the plunger valve 218 may be configured to close and prevent fluidic communication between the intake conduit 20 and the valve stem chamber 212 while the plunger 214 moves away from the intake valve seat 204. The plunger valve 218 may therefore be a check valve (e.g., one-way valve) including a ball and spring or other mechanisms enabling the aforementioned functionality. Thus, the plunger valve 218 may open while the intake valve head 202 is moving in an opening direction away from the intake valve seat. It will be understood that the opening direction opposes the closing direction 300 of the intake valve head 202. In this way, the valve stem chamber 212 may be pressure balanced with the intake conduit 20, during an intake valve opening event. In other words, the purge pump may be operated at intake port pressure. As a result, a desired amount of purge air can be provided to the pre-chamber as the intake port pressure varies based on engine operating conditions and the purge pump 46 may avoid drawing a vacuum during a valve opening event. However, in other instances, the source of the air in the valve stem chamber 212 may be drawn from another location, such as upstream of an EGR outlet in the intake system.

FIG. 4 shows a detailed view of the pre-chamber nozzle 38 as viewed upward with regard to the Z axis, shown in FIG. 3. The pre-chamber nozzle 38 includes orifices 400 providing fluidic communication between the pre-chamber 32 and the combustion chamber 18, shown in FIGS. 2-3. A central axis 402 of the pre-chamber nozzle 38 is illustrated. In one example, the central axis 402 of the pre-chamber nozzle 38 may be parallel to the central axis 207 of the combustion chamber 18, shown in FIG. 2. However, other nozzle arrangements have been contemplated. It will be appreciated that the orifices 400 may be configured to flow hot, partially combusted gas into the combustion chamber 18 during a power stroke (e.g., an early part of the power stroke) of the piston 206, shown in FIG. 3, in one example. The timing of the ignition jet may be similar to spark timing in the engine, in one instance. Thus, the ignition jet may be flowed into the combustion chamber during a later part of the compression stroke or TDC, in other examples. Thus, the orifices may be coupled to a passage extending into the pre-chamber and providing fluidic communication between the pre-chamber and the combustion chamber. In this way, hot gases can penetrate deeper into the combustion chamber, enabling more evenly distributed combustion chamber seeding. As a result, combustion efficiency is increased and emissions are reduced.

FIG. 5 shows a second embodiment of the pre-chamber ignition system 12. The Z axis and X axis are provided for reference. The second embodiment of the pre-chamber ignition system and the first embodiment of the pre-chamber ignition system 12 include several overlapping components. Therefore, similar components are labelled accordingly and redundant descriptions are omitted. However, it will be appreciated that the overlapping components may share similar functionalities, structures, etc.

The pre-chamber ignition system 12 shown in FIG. 5 includes the purge pump 46. The purge pump 46 provides purge air to the purge passage 44. The purge pump 46 may be driven by power from an energy storage device (e.g., battery, flywheel, etc.) and/or driven by rotational energy from the crankshaft. Further, in one example, the purge pump may be a pressurized reservoir. In such an example, the purge pump may produce a smooth flow as opposed to a pulsing flow.

Again, the purge port 40 with the purge valve 42 is configured to regulate the airflow into the pre-chamber 32. Actuation of the purge pump 46 may be timed to generate purge airflow into the pre-chamber 32 during an intake stroke of the piston 206, in one example. Specifically, the purge airflow may be generated during a closing event of the intake valve 24. In this way, the purge operation may be carried out between cyclical compression and power strokes of the piston. However, in other examples, the purge airflow may be generated during other intervals, such as during an opening event of the intake valve 24.

The purge pump 46 is positioned between the intake valve 24 and the exhaust valve 28 with regard to a horizontal axis, in the illustrated example. Specifically, the purge pump 46 is positioned between the pre-chamber fuel injector 36 and the intake valve 24. Furthermore, the purge pump 46 is adjacent to the pre-chamber ignition device 34. Positioning the purge pump 46 in this way may enable space saving gains to be achieved. However, alternate positions of the purge pump have been contemplated. For instance, the purge pump may be integrated around the exhaust valve stem, in one example. In another example, the purge pump may include a plunger driven by either cam shaft and may be mounted above the cam cover. In yet another example, the purge pump may be mounted externally to the engine. In such an example, the purge valve 44 may be a solenoid valve.

The pre-chamber ignition system 12 also includes a purge pump inlet passage 500 providing feed air to the purge pump 46. The purge pump inlet passage 500 includes an inlet 502 opening into the intake conduit 20 at a location upstream of the outlet 68 of the EGR conduit 62 having the EGR valve 64 coupled thereto. The inlet 502 is also positioned downstream of the throttle 22, in the illustrated example. In an exemplary engine designed to generate boost and provide low pressure EGR, the purge air may be sourced between the air cleaner and the EGR entry point upstream of the turbo compressor. In this way, feed air for the purge pump can be drawn from a location upstream of where EGR gas is expelled into the intake system. Consequently, the purge pump can draw in clean air to avoid purging the pre-chamber with EGR gases and enable EGR operation to be implemented without impacting pre-chamber purge operation. In this way, residuals in the pre-chamber can be further reduced, thereby improving the pre-chamber ignition sequence. Additionally, the inlet 66 of the EGR conduit 62 is shown positioned upstream of the emission control device 58 in exhaust conduit 56. However, in other examples, the inlet 66 may be positioned downstream of the emission control device 58. Further, in another example, the purge pump inlet passage 500, shown in FIG. 5, may be applied the embodiment of the purge pump shown in FIG. 2. In such an example, the purge pump's connection to the intake port may be omitted from the system.

Now turning to FIG. 6, map 600 depicts example valve timing, purge airflow timing, pre-chamber fuel injection timing, and pre-chamber ignition timing with respect to a piston position, for an engine combustion chamber including an intake valve, an exhaust valve, and pre-chamber ignition system, such as described in FIGS. 1-5. The example of FIG. 6 is drawn substantially to scale, even though each and every point is not labeled with numerical values. As such, relative differences in timings can be estimated by the drawing dimensions. However, other relative timings may be used, if desired.

Continuing with FIG. 6, map 600 illustrates an engine position along the x axis in crank angle degrees (CAD). Curve 602 depicts piston positions (along the y axis), with reference to their location from top dead center (TDC) and/or bottom dead center (BDC), and further with reference to their location within the four strokes (intake, compression, power and exhaust) of an engine cycle.

During engine operation, the combustion chamber typically undergoes a four stroke cycle including an intake stroke, compression stroke, expansion stroke, and exhaust stroke. During the intake stroke, generally, the exhaust valves close and intake valves open. Air is introduced into the combustion chamber via the corresponding intake conduit, and the piston moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the combustion chamber. In a process herein referred to as ignition, the injected fuel in the combustion chamber is ignited by hot partially combusted gas jets from the pre-chamber nozzle, resulting in combustion. It will be appreciated that fuel and spark are also introduced into the pre-chamber prior to jetting the hot gas into the combustion chamber. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages and the piston returns to TDC.

Curve 604 depicts intake valve timing, lift, and duration for an intake valve. As illustrated, the intake valve is opened during the intake stroke of the piston. However, it will be appreciated that the intake valve may be operated with a different timing by adjusting the phasing, lift and/or duration based on engine conditions, in other examples. L depicts the valve lift amount and D depicts the valve opening duration.

Curve 606 depicts the purge airflow pressure (along the y axis). As shown, the purge airflow is coordinated with an intake valve closing stroke. Consequently, the purge airflow can be implemented during a desired time interval without interfering with pre-chamber ignition and injection events. PD indicates the purge duration during which purge airflow is occurring in the pre-chamber.

Curve 608 depicts the pre-chamber fuel injection pressure (along the y axis). FID indicates the pre-chamber fuel injection duration. As shown, the pre-chamber fuel injection is carried out during the compression stroke of the piston. Specifically, the pre-chamber injection may be implemented during or after the purge air flow into the pre-chamber and as late so as to overlap with the spark event, in one example. However other pre-chamber injection timing schemes have been contemplated.

Plot 610 depicts the pre-chamber ignition signal (along the y axis). ID indicates the ignition duration. As shown, the pre-chamber ignition may be carried out during the compression stroke of the piston. Specifically, the pre-chamber ignition timing will be varied as a function of engine operating conditions similar to how spark timing is varied in conventional ignition systems. Pre-chamber ignition may be advanced under dilute conditions or retarded to avoid knock or to provide late combustion phasing for increasing the temperature of the after treatment system. Ignition timings may vary from 50° before top center to 20° after top center, in one example. However other pre-chamber ignition timing schemes have been contemplated.

As shown in FIG. 6 the purge airflow is implemented during the intake stroke prior to the compression stroke when the pre-chamber injection event and the pre-chamber ignition event occur. In this way, the pre-chamber can be purged with airflow between pre-chamber injection and ignition events. As such, several advantages may be achieved. For example, the burn rate of combustion may be increased along with combustion stability, which may be particularly beneficial during residual conditions (e.g., EGR residuals and/or internal residuals). Consequently, combustion efficiency can be increased while emissions are reduced. Additionally, fuel economy may be improved because excess fuel may not be injected into the combustion chamber and/or pre-chamber to maintain a stoichiometric ratio.

It will be appreciated that the plots shown in FIG. 6 are exemplary in nature and that, in other examples, the timing of intake valve and therefore pre-chamber purge flow and/or pre-chamber injection and pre-chamber ignition may differ. For instance, variable valve lift (VVL) engines and Atkinson and miller cycle engine may have a different valve timing, such as early or late intake valve closing). FIG. 7 shows a method 700 for operation of a pre-chamber ignition system. Method 700 may be implemented by the pre-chamber ignition system described above with regard to FIGS. 1-6 or may be implemented by other suitable pre-chamber ignition systems, in other examples. Instructions for carrying out the method 700 and other methods described herein may be executed by a controller based on instructions stored in memory of the controller and in conjunction with signals received from sensors of in the engine and corresponding systems, such as the sensors described above with reference to FIG. 1. The controller may employ engine actuators of the engine systems to adjust engine operation, according to the methods described below.

At 702 the method includes providing fuel to a combustion chamber. Providing fuel to the combustion chamber may include, at 704 directly injecting fuel into the combustion chamber from a direct fuel injector and/or at 706 injecting fuel into an intake conduit from a port fuel injector. In this way, an ignitable air/fuel mixture resides in the combustion chamber in anticipation of a seed event from the pre-chamber. Injecting fuel into the combustion chamber and/or the intake conduit may include sending a command signal (e.g., pulse width signal) from a controller to a fuel injector causing injection of a determined amount of fuel into the combustion chamber and/or the intake conduit, in one example.

Next, at 708, the method includes injecting fuel into a pre-chamber from a pre-chamber fuel injector coupled to the pre-chamber. In one example, injecting fuel into the pre-chamber from the pre-chamber fuel injector may be carried out by a controller sending a command signal (e.g., pulse width signal) to the pre-chamber fuel injector valve causing injection of a determined amount of fuel into the pre-chamber. At 710 the method includes igniting an air/fuel mixture in the pre-chamber via an ignition device coupled to the pre-chamber and at 712 the method includes jetting at least partially combusted gases into the combustion chamber from the pre-chamber (as a result of igniting and combusting the air-fuel mixture in the pre-chamber). Igniting the air/fuel mixture may include sending a command signal from a controller to an actuator in the pre-chamber ignition device to cause a spark to be generated in the pre-chamber at a desired time interval, in one example. Additionally, jetting the partially combustion gases into the combustion chamber may include flowing hot gases through the pre-chamber nozzle slightly before and/or during a power stroke of the piston, for example. As such, the combustion chamber is seeded with hot gas jets from the pre-chamber. It will be appreciated that steps 708-710 are implemented during a compression stroke of a piston and step 712 is implemented at the time at which it is desired to ignite the main charge (e.g., late compression stroke or early power stroke). However, in other examples steps 708 and 710 may be implemented during both the compression stroke and the power stroke or solely during the power stroke.

At 714, the method includes flowing purge air from a positive displacement pump to the pre-chamber. For example, the purge pump may generate airflow that is directed to a purge passage, from the purge passage to a purge port, and from the purge port into the pre-chamber. Additionally in one example, a purge valve may be included in the purge port which opens and provides purge airflow to the pre-chamber based on operating conditions. For instance, the purge valve may automatically open when a pressure in the purge port exceeds a threshold value or in response to a controller sending opening instructions to a purge valve actuator.

Step 714 may be implemented during an intake stroke and/or early during a compression stroke. In this way, fresh intake air can be provided to the pre-chamber to purge residual gases in the pre-chamber generated during combustion events in the pre-chamber. Therefore, the technical effect of providing fresh air to the pre-chamber is an increase in burn rate and combustion stability which in turn increases combustion efficiency and reduces emissions.

The method may also include, at 716, flowing exhaust gas from an EGR conduit to an intake conduit at a location downstream of an inlet of a purge pump inlet passage providing air to the positive displacement pump. In this way, the positive displacement pump may be provided with intake air from a location upstream of an EGR outlet. As a result, the air/fuel mixture in the pre-chamber may be more easily ignited during EGR operation. However, in other examples, the positive displacement pump may include a plunger that draws air from the intake port, as is the case in the first embodiment of the pre-chamber ignition system, described above with regard to FIGS. 2-4. In such an example, the positive displacement pump may further include a valve stem chamber at least partially circumferentially surrounding the intake valve stem. Continuing with such an example, the plunger may be attached to an intake valve stem and the purge airflow may be generated by reciprocal motion of the plunger in the valve stem chamber.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will further be described in the following paragraphs. In one aspect, a system is provided. The system comprises a combustion chamber formed by a cylinder head coupled to a cylinder block, a pre-chamber in fluidic communication with the combustion chamber, a purge port coupled to the pre-chamber and structured to flow purge air into the pre-chamber, where the flow of the purge air is driven by operation a purge pump, and a piston disposed within the combustion chamber.

In another aspect, a method for operation of a pre-chamber ignition system is provided. The method comprises during a compression stroke, injecting fuel into a pre-chamber from a pre-chamber fuel injector coupled to the pre-chamber and igniting an air fuel mixture in the pre-chamber via an ignition device coupled to the pre-chamber, and during an intake stroke, flowing purge air from a positive displacement pump to the pre-chamber.

In yet another aspect, a pre-chamber ignition system is provided. The pre-chamber ignition system includes a combustion chamber formed by a cylinder head coupled to a cylinder block, a pre-chamber in fluidic communication with the combustion chamber, a purge port in fluidic communication with a purge passage, a valve stem chamber in fluidic communication with the purge passage, a plunger coupled to an intake valve stem, where reciprocal movement of the plunger generates purge airflow from the valve stem chamber to the pre-chamber through the purge passage and the purge port, and a piston disposed within the combustion chamber.

In any of the aspects herein or combinations of the aspects, the purge pump may be a positive displacement pump including a plunger attached to an intake valve stem, the purge airflow generated by reciprocal motion of the plunger.

In any of the aspects herein or combinations of the aspects, the system may further include a purge passage in fluidic communication with the purge port and a valve stem chamber at least partially circumferentially surrounding the intake valve stem, the positive displacement pump further including the valve stem chamber.

In any of the aspects herein or combinations of the aspects, the purge passage may traverse a section of the cylinder head positioned between the intake valve stem and an exhaust valve stem with regard to a horizontal axis.

In any of the aspects herein or combinations of the aspects, the system may further include a plunger valve in the plunger, the plunger valve structured to open and provide fluidic communication between an intake conduit and the valve stem chamber while an intake valve head moves away from an intake valve seat in the cylinder head in an opening direction.

In any of the aspects herein or combinations of the aspects, when an intake valve head moves toward an intake valve seat in the cylinder head in a closing direction the plunger may generate airflow into the pre-chamber.

In any of the aspects herein or combinations of the aspects, the purge port may include a purge valve structured to regulate the flow of the purge air into the pre-chamber and to prevent back flow of combustion products into the purge pump and where the purge valve is structured to open when a pressure delta between the pre-chamber and the purge port exceeds a threshold value.

In any of the aspects herein or combinations of the aspects, the pre-chamber may be positioned vertically above an intake valve head with regard to a central axis of the combustion chamber.

In any of the aspects herein or combinations of the aspects, the system may further include an ignition device coupled to the pre-chamber and a fuel injector coupled to the pre-chamber.

In any of the aspects herein or combinations of the aspects, an outlet of an exhaust gas recirculation (EGR) conduit may open into an intake conduit downstream of an inlet of a purge pump inlet passage providing air to the purge pump.

In any of the aspects herein or combinations of the aspects, the method may further include, injecting fuel from a direct fuel injector into the combustion chamber.

In any of the aspects herein or combinations of the aspects, the method may further include, flowing exhaust gas from an exhaust gas recirculation (EGR) conduit to an intake conduit at a location downstream of an inlet of a purge pump inlet passage providing air to the positive displacement pump.

In any of the aspects herein or combinations of the aspects, the positive displacement pump may include a plunger and a valve stem chamber, the valve stem chamber at least partially circumferentially surrounding an intake valve stem and the plunger attached to the intake valve stem, the purge airflow generated by reciprocal motion of the plunger in the valve stem chamber.

In any of the aspects herein or combinations of the aspects, the pre-chamber ignition system may further include a purge valve positioned in the purge port, the purge valve structured to open when a pressure in the purge passage is above a threshold value.

In any of the aspects herein or combinations of the aspects, the pre-chamber ignition system may further include a plunger valve in the plunger, the plunger valve structured to open and provide fluidic communication between an intake conduit and the valve stem chamber while an intake valve head moves away from an intake valve seat in the cylinder head in an opening direction.

In any of the aspects herein or combinations of the aspects, when an intake valve head moves toward an intake valve seat in the cylinder head in a closing direction the plunger generates airflow into the pre-chamber.

In any of the aspects herein or combinations of the aspects, the purge passage may traverse the cylinder head at a location between the intake valve stem and an exhaust valve stem with regard to a horizontal axis.

In any of the aspects herein or combinations of the aspects, the pre-chamber ignition system may further an ignition device coupled to the pre-chamber and a fuel injector coupled to the pre-chamber.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a pre-chamber ignition system in an engine, comprising:
during a compression stroke, injecting a fuel into a pre-chamber from a pre-chamber fuel injector coupled to the pre-chamber to form an air fuel mixture, igniting the air fuel mixture in the pre-chamber via an ignition device coupled to the pre-chamber; and
during an intake stroke subsequent to the compression stroke, flowing purge air from a positive displacement pump into the pre-chamber through a purge passage traversing the engine;
where the pre-chamber is in fluid communication with a combustion chamber, where the positive displacement pump includes a plunger attached to a valve stem of a valve coupled to the combustion chamber, where the flow of purge air is generated by reciprocal motion of the plunger, and where the valve is an intake valve or an exhaust valve of the combustion chamber.

2. The method of claim 1, further comprising injecting a fuel from a direct fuel injector into the combustion chamber.

3. The method of claim 1, further comprising flowing exhaust gas from an exhaust gas recirculation (EGR) conduit to an intake conduit at a location downstream of an inlet of a purge pump inlet passage providing air to the positive displacement pump.

4. The method of claim 1, where the positive displacement pump includes a valve stem chamber, where the valve stem is an intake valve stem, where the valve stem chamber at least partially circumferentially surrounds the intake valve stem and the plunger is attached to the intake valve stem, and where the purge air flow is generated by the reciprocal motion of the plunger in the valve stem chamber.

5. The method of claim 4, where the pre-chamber ignition system comprises a plunger valve in the plunger, and where the plunger valve opening and providing fluidic communication between an intake conduit and the valve stem chamber while an intake valve head moves away from an intake valve seat in a cylinder head in an opening direction.

6. The method of claim 1, where the purge passage is included in the pre-chamber ignition system and is in fluidic communication with a purge port and a valve stem chamber at least partially circumferentially surrounding the valve stem and where the positive displacement pump further includes the valve stem chamber.

7. The method of claim 6, where the purge passage traverses a section of a cylinder head positioned between an intake valve stem and an exhaust valve stem with regard to a horizontal axis.

8. The method of claim 6, where when an intake valve head moves toward an intake valve seat in a cylinder head in a closing direction the plunger generates the flow of purge air into the pre-chamber.

9. The method of claim 1, where a purge port in the pre-chamber ignition system includes a purge valve regulating the flow of the purge air into the pre-chamber and prevents back flow of combustion products into the positive displacement pump and where the purge valve opens when a pressure delta between the pre-chamber and the purge port exceeds a threshold value.

10. The method of claim 1, where the pre-chamber is positioned vertically above an intake valve head with regard to a central axis of the combustion chamber.

11. The method of claim 1, where the pre-chamber ignition system comprises the pre-chamber fuel injector and the ignition device.

12. The method of claim 1, where the pre-chamber ignition system comprises an outlet of an exhaust gas recirculation (EGR) conduit opening into an intake conduit downstream of an inlet of a positive displacement pump passage providing air to the positive displacement pump.

13. The method of claim 1, further comprising injecting a fuel into the combustion chamber from a port fuel injector.

14. The method of claim 13, where the fuel is injected into the combustion chamber prior to the injection of the fuel from the pre-chamber fuel injector into the pre-chamber.

15. The method of claim 1, further comprising jetting gases that are at least partially combusted from the pre-chamber into the combustion chamber.

16. The method of claim 15, where the gases are jetted through a plurality of orifices in the pre-chamber.

17. The method of claim 15, where the gases are jetted into the combustion chamber before and/or during a power stroke of a piston in the combustion chamber.

18. The method of claim 15, where the combustion chamber is formed by a cylinder head coupled to a cylinder block and where the pre-chamber is positioned in the cylinder head.

\* \* \* \* \*